US009621400B2

(12) United States Patent
Heng et al.

(10) Patent No.: US 9,621,400 B2
(45) Date of Patent: Apr. 11, 2017

(54) SYSTEMS AND METHODS FOR TRANSMITTING CONTENT

(71) Applicant: BROADCOM CORPORATION, Irvine, CA (US)

(72) Inventors: Brian Allan Heng, Irvine, CA (US); Wade Keith Wan, Orange, CA (US); Yong Li, San Diego, CA (US); Xuemin Chen, Rancho Sante Fe, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 518 days.

(21) Appl. No.: 13/931,155

(22) Filed: Jun. 28, 2013

(65) Prior Publication Data

US 2014/0359153 A1 Dec. 4, 2014

Related U.S. Application Data

(60) Provisional application No. 61/830,024, filed on May 31, 2013.

(51) Int. Cl.
*G06F 15/16* (2006.01)
*H04L 29/06* (2006.01)
(Continued)

(52) U.S. Cl.
CPC ...... *H04L 29/06517* (2013.01); *H04L 65/601* (2013.01); *H04L 65/605* (2013.01);
(Continued)

(58) Field of Classification Search
CPC .............................. H04L 65/60; H04L 65/605
(Continued)

(56) References Cited

U.S. PATENT DOCUMENTS

2007/0136311 A1* 6/2007 Kasten et al. .................. 707/10
2008/0165693 A1* 7/2008 Castro ................. H04L 12/2856
370/237

(Continued)

OTHER PUBLICATIONS

Adaptive bitrate streaming | Wikipedia, http://en.wikipedia.org/wiki/Adaptive_bitrate_streaming, visited Oct. 20, 2011.

*Primary Examiner* — Minh-Chau Nguyen
(74) *Attorney, Agent, or Firm* — McDermott Will & Emery LLP

(57) ABSTRACT

Systems and methods for transmitting content are provided. In some aspects, a method includes receiving an indication of a plurality of input streams of content. Each input stream is associated with an input bit rate. The method includes determining a plurality of output bit rates at which to transmit the content to one or more client devices, comparing the plurality of input bit rates to the plurality of output bit rates, and generating, by a server, a plurality of output streams of the content based on the comparison. Each generated output stream is associated with a corresponding output bit rate and includes a transcoded input stream or a non-transcoded input stream. The plurality of output streams is generated such that a number of output streams comprising non-transcoded input streams is maximized. The method also includes transmitting the generated output streams to the one or more client devices.

20 Claims, 5 Drawing Sheets

(51) Int. Cl.
    *H04N 21/2343*    (2011.01)
    *H04N 21/262*    (2011.01)
    *H04N 21/643*    (2011.01)

(52) U.S. Cl.
    CPC . *H04N 21/23439* (2013.01); *H04N 21/26258* (2013.01); *H04N 21/64322* (2013.01)

(58) Field of Classification Search
    USPC .................................................. 709/230–232
    See application file for complete search history.

(56) References Cited

U.S. PATENT DOCUMENTS

| | | | |
|---|---|---|---|
| 2008/0285460 A1* | 11/2008 | Oren | H04L 12/2805 |
| | | | 370/238 |
| 2009/0083279 A1* | 3/2009 | Hasek | H04L 67/2823 |
| 2012/0191805 A1* | 7/2012 | Fee | H04N 21/2343 |
| | | | 709/217 |
| 2014/0282771 A1* | 9/2014 | Tumuluru | H04N 21/2662 |
| | | | 725/95 |

* cited by examiner

SYSTEMS AND METHODS FOR TRANSMITTING CONTENT

CROSS-REFERENCES TO RELATED APPLICATIONS

The present application claims the benefit of U.S. Provisional Patent Application Ser. No. 61/830,024, titled "Systems and Methods for Transmitting Content," filed on May 31, 2013, which is hereby incorporated by reference in its entirety for all purposes.

FIELD

The subject technology generally relates to systems and methods for transmitting content.

BACKGROUND

Adaptive bit rate streaming is a technique used in streaming multimedia over networks. It involves detecting a user device's bandwidth and central processing unit (CPU) capacity in real time, and adjusting the quality of a multimedia stream accordingly. An encoder, for example, may be used to encode a single multimedia source at multiple bit rates. The user device may switch between streaming the different encodings depending on available resources. As a result, adaptive bit rate streaming requires little to no buffering, has fast start times, and can be used for both high-end and low-end connections.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
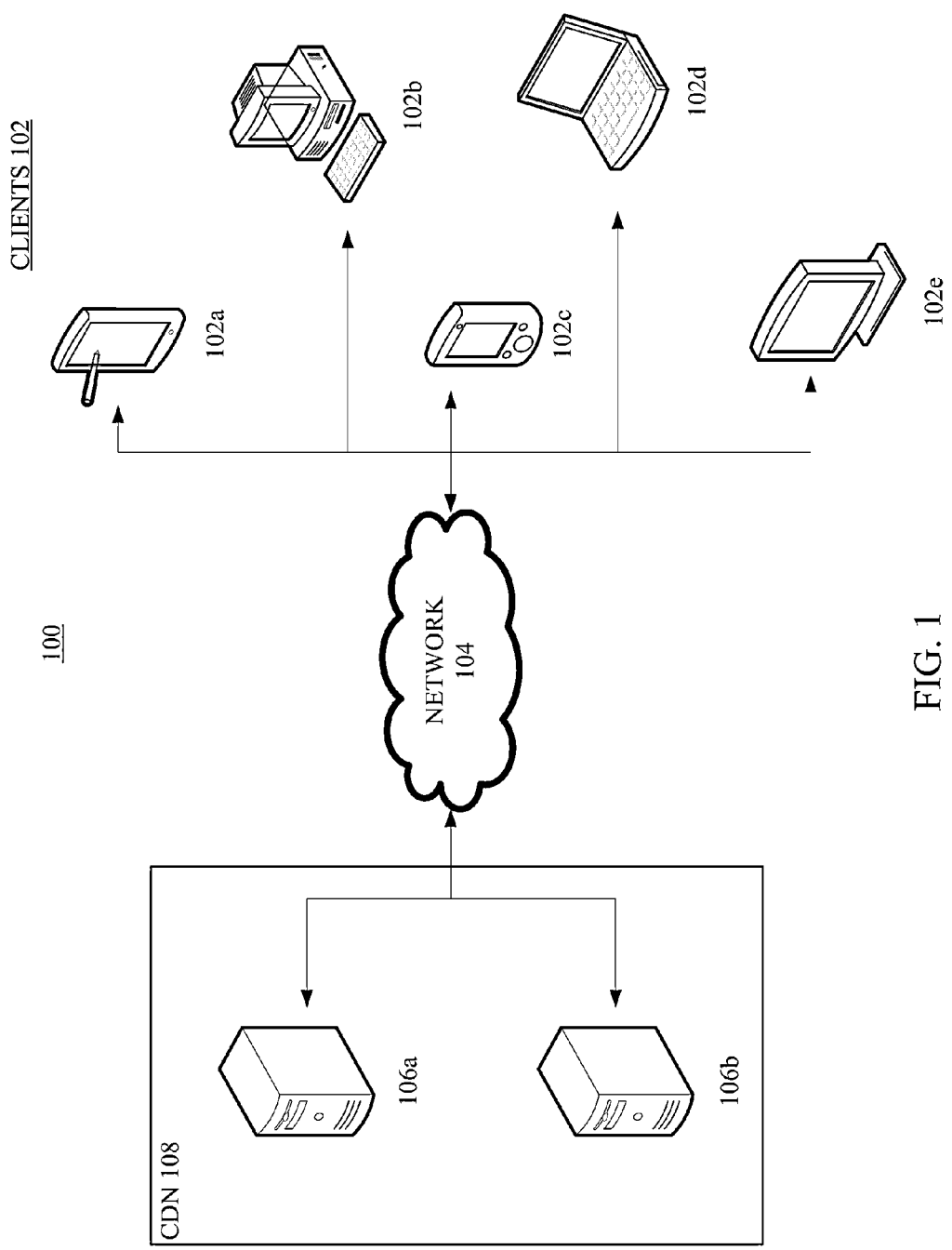
FIG. 1 illustrates an example of an environment in which adaptive bit rate streaming may be used, in accordance with various aspects of the subject technology.

FIG. 1 illustrates an example of environment 100 in which adaptive bit rate streaming may be used, in accordance with various aspects of the subject technology. Environment 100 includes content delivery network (CDN) 108 and client devices 102 (e.g., client devices 102a, 102b, 102c, 102d, and 102e). CDN 108 includes servers 106 (e.g., servers 106a and 106b). One goal of CDN 108 is to serve content to client devices 102 with high availability and high performance. In some aspects, the phrase "content delivery network," as used herein, encompasses its plain and ordinary meaning (e.g., as understood by those of ordinary skill in the art). In some aspects, the phrase "content delivery network," as used herein, refers to any entity that delivers content (e.g., a cable head-end that delivers content as an analog and/or a digital cable transmission, a satellite television provider that delivers content as a satellite transmission, any one or more devices that deliver content to another device, etc.).

As shown in FIG. 1, CDN 108 and client devices 102 are connected over network 104. Network 104 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, network 104 can include, but is not limited to, any one or more network topologies such as a bus network, a star network, a ring network, a mesh network, a star-bus network, tree or hierarchical network, and the like.

Client devices 102 and servers 106 can be any electronic device having processing hardware, memory, and communications capability necessary to perform some or all of the operations disclosed herein. Client devices 102, for example, can be desktop computers (e.g., client device 102b), mobile computers (e.g., client device 102d), tablet computers (e.g., client device 102a), mobile devices (e.g., smartphones or personal digital assistants such as client device 102c), set top boxes (e.g., including televisions with one or more processors coupled thereto and/or embedded therein, such as client device 102e), video game consoles, or any other electronic devices having memory, processing hardware, and communications capabilities for receiving content from servers 106. Servers 106 may be adaptive bit rate (ABR) servers that provide content over network 104 to client devices 102.

Figure 2:
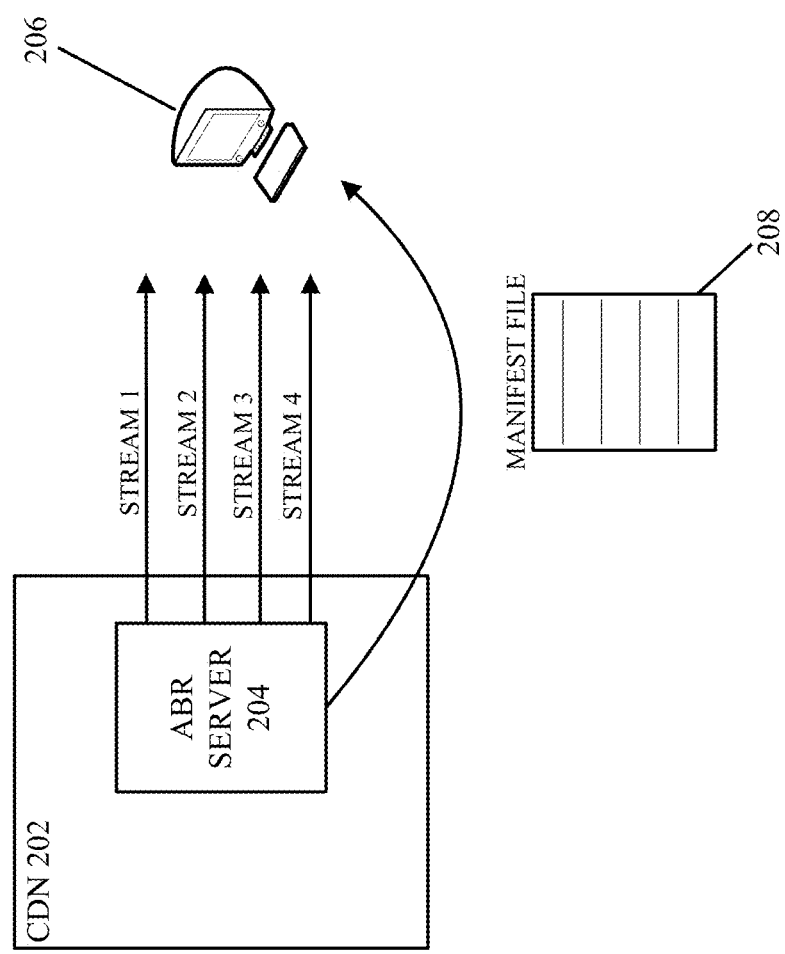
FIG. 2 illustrates an example of an adaptive bit rate server providing content to a particular client device, in accordance with various aspects of the subject technology.

FIG. 2 illustrates an example of ABR server 204 providing content to a particular client device 206, in accordance with various aspects of the subject technology. As shown in FIG. 2, ABR server 204 is part of CDN 202. In an adaptive bit rate streaming system, ABR server 204 may deliver content, such as video and/or audio, to client device 206 in different content streams (e.g., shown in FIG. 2 as stream 1, stream 2, stream 3, and stream 4). Each of these streams may comprise a different version of the content. For example, each stream may comprise one or more segments of the content (e.g., each segment may have a duration of 2-10 seconds). The segments of one stream may be a different variant of the segments of another stream (e.g., segments from different streams may be encoded at different bit rates). Providing different versions of the content to client device 206 allows client device 206 to receive the content in a way that is most appropriate for itself. For example, client device 206 may select a stream at a bit rate that it is capable of receiving based on its computing resources and available bandwidth.

ABR server 204 may determine the particular streams that client device 206 is likely able to receive and may advertise these streams as being available to the client device. When advertising to client device 206, ABR server 204 may rank these streams in order from the highest bit rates available to the lowest bit rates available, thereby prioritizing the streams according to bit rates. For example, ABR server 204 may generate, and send to client device 206, manifest file 208 that lists the available streams in their ranked order, the different bit rates at which each of these streams has been encoded, and a network identifier for accessing each segment of a corresponding stream (e.g., a uniform resource locator (URL)). Thus, manifest file 208 provides an indication to client device 206 of which streams are available according to bit rates.

Client device 206 may retrieve each stream at the bit rate that is appropriate for itself (e.g., based on network bandwidth conditions that are determinable by client device 206). In this manner, client device 206 may adaptively retrieve streams that are encoded at different bit rates in accordance with changing network bandwidth conditions.

Figure 3:
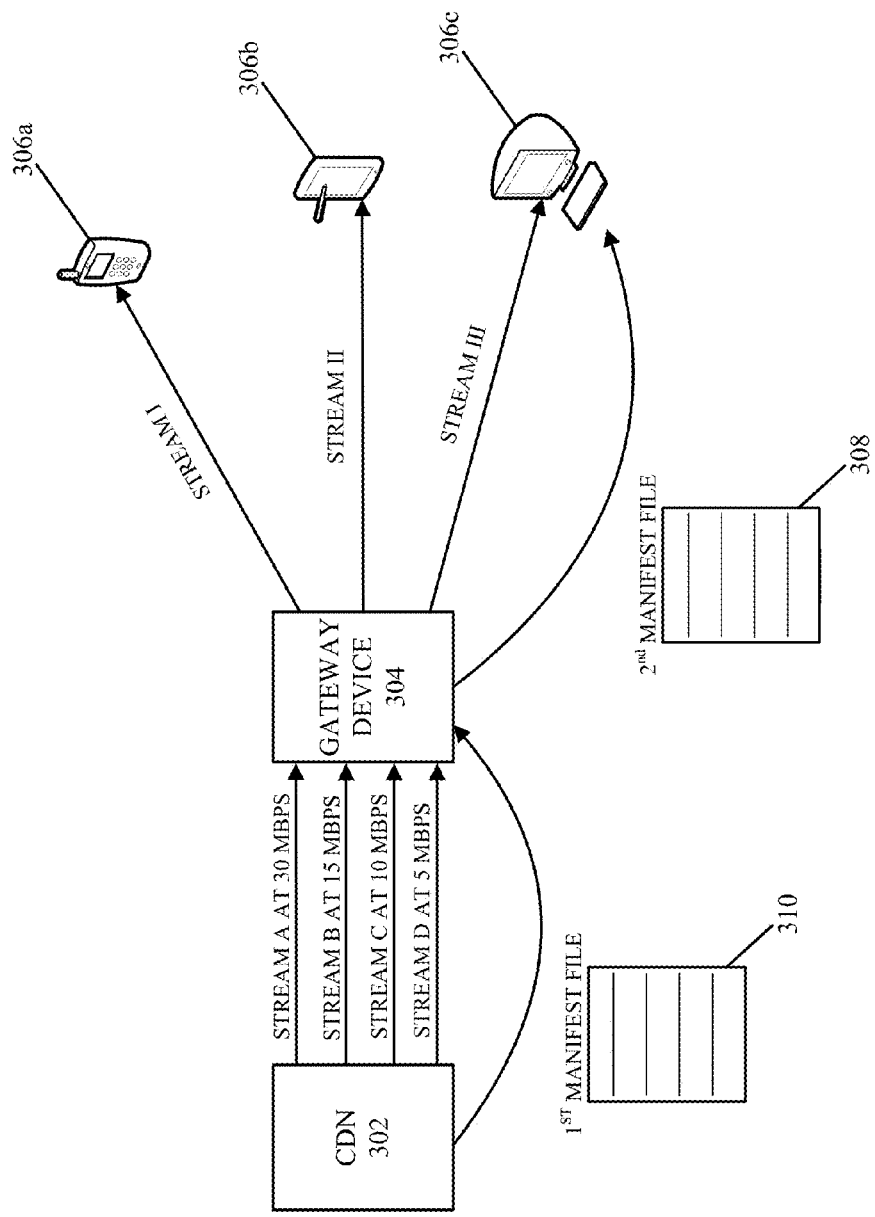
FIG. 3 illustrates an example of a gateway device placed between a content delivery network and client devices, in accordance with various aspects of the subject technology.

In some aspects, a gateway device may be placed between a CDN and one or more client devices to facilitate communications between the CDN and the one or more client devices. FIG. 3 illustrates an example of gateway device 304 placed between CDN 302 and client devices 306 (e.g., client devices 306a, 306b, and 306c), in accordance with various aspects of the subject technology. Gateway device 304, for example, may be a set top box in a home that receives content from CDN 302 and distributes the content to different client devices 306 within the home. However, gateway device 304 may be a device that receives content and distributes it to different client devices in any suitable network.

According to certain aspects, CDN 302 may provide a single stream of the content to gateway device 304. For example, such a stream may be a high quality stream of content (e.g., highest resolution available, highest bit rate available, etc.). In one or more implementations, the single stream may be a non-segment-based stream of content, such as a quadrature amplitude modulation (QAM) stream of content from CDN 302. However, it is understood that the single stream of content may be a stream of content in any suitable format.

CDN 302 may also provide a plurality of streams of the content to gateway device 304. In some aspects, at least one of these streams may be a single high quality stream of content as discussed above. In some aspects, some or all of the plurality of streams may be segment-based streams of the content, such as the ABR streams as discussed with respect to FIG. 2. In such a situation, CDN 302 may utilize adaptive bit rate streaming to provide the content to gateway device 304, which may serve as a client device relative to CDN 302. For example, as shown in FIG. 3, CDN 302 may provide a plurality of segment-based streams (e.g., stream A at 30 megabits per second (mbps), stream B at 15 mbps, stream C at 10 mbps, and stream D at 5 mbps) to gateway device 304. CDN 302 may provide gateway device 304 with manifest file 310 that lists the available streams, such as stream A, stream B, stream C, and stream D. Gateway device 304 may request from CDN 302 one or more of the available streams listed in manifest file 310, and receive the requested streams from CDN 302. Although gateway device 304 is shown as receiving the plurality of streams from a single CDN 302 in FIG. 3, it is understood that gateway device 304 can receive any number of streams from any number of content delivery networks. For example, gateway device 304 may receive stream A from a first CDN, stream B from a second CDN, stream C from a third CDN, and stream D from a fourth CDN.

Upon receiving the content from CDN 302, gateway device 304 may provide the content to client devices 306. In some aspects, gateway device 304 may provide a single stream of the content to each client device 306. In some aspects, gateway device 304 may provide a plurality of streams of the content to each client device 306. These streams, for example, may include at least one non-segment-based stream of content (such as a single high quality stream of content) and/or at least one segment-based stream of content (such as the ABR streams as discussed with respect to FIG. 2).

When gateway device 304 provides multiple segment-based streams of the content for each client device 306, gateway device 304 may serve as an adaptive bit rate server (e.g., relative to client devices 306) and utilize adaptive bit rate streaming to provide the content to each client device 306. For example, as shown in FIG. 3, gateway device 304 may (i) provide client device 306c manifest file 308 that lists available streams (e.g., stream A, stream B, stream C, stream D, etc.), (ii) receive a request from client device 306c for one or more of the available streams listed in manifest file 308, and (iii) provide the requested streams to client device 306c.

However, client devices 306 may sometimes request streams at bit rates that are not provided by CDN 302. In this regard, gateway device 304 may receive the content streams from CDN 302 at a particular set of bit rates, transcode at least one of these streams to different bit rates that are requested by client devices 306, and transmit the transcoded streams to client devices 306.

According to various aspects of the subject technology, systems and methods are provided for efficiently and reliably facilitating communications between a CDN (e.g., CDN 302) and one or more client devices (e.g., client devices 306). In one or more implementations, a gateway device (e.g., gateway device 304) may minimize the amount of transcoding needed to be performed by bypassing all streams received from the CDN that are encoded at bit rates that match the bit rates requested by the client devices. Thus, these streams may pass through the gateway device to the client devices without having to be transcoded. For the streams that need to be transcoded, the gateway device does not necessarily select the stream from the CDN encoded at the highest bit rate for transcoding, but may select streams from the CDN that are encoded at bit rates closest to the requested bit rates, thereby allowing these streams to be transcoded quickly. In one or more implementations, when the gateway device transmits the streams to the client devices, it may simultaneously distribute each stream over at least two channels. Thus, if an error occurs in the transmission of one stream in one channel, the same stream in a different channel may be used instead. Furthermore, the streams may be distributed in such a way that the capacity of each channel is maximized.

Figure 4:
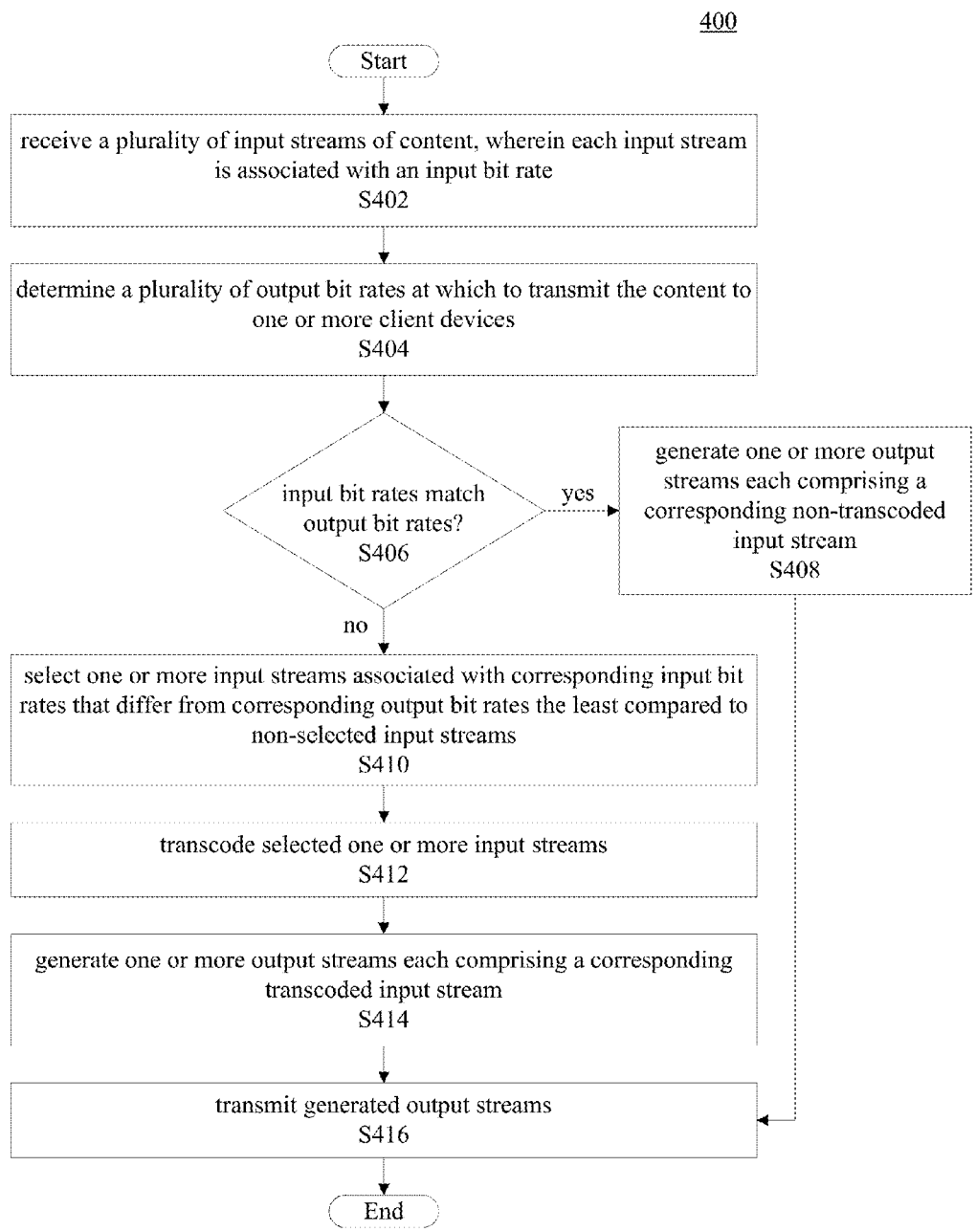
FIG. 4 illustrates an example of a method for transmitting content, in accordance with various aspects of the subject technology.

FIG. 4 illustrates an example of method 400 for transmitting content, in accordance with various aspects of the subject technology. Method 400 is described herein with reference to FIG. 3. However, method 400 is not limited to the examples presented in FIG. 3. Furthermore, although method 400 is illustrated in the order shown in FIG. 4, it is understood that method 400 may be implemented in a different order.

According to S402, gateway device 304 receives a plurality of input streams of content from CDN 302 (e.g., stream A, stream B, stream C, and stream D). Each of these streams is associated with an input bit rate (e.g., stream A comprises at least one segment of the content encoded at 30 mbps, stream B comprises at least one segment of the content encoded at 15 mbps, stream C comprises at least one segment of the content encoded at 10 mbps, and stream D comprises at least one segment of the content encoded at 5 mbps).

According to S404, gateway device 304 determines a plurality of output bit rates at which to transmit the content to client devices 306. In some aspects, gateway device 304 may determine the output bit rates to be the bit rates that are requested by client devices 306. In some aspects, gateway device 304 may determine the output bit rates to be the bit rates that each client device 306 is capable of receiving (e.g., based on network bandwidth conditions, computing resources of each client device 306, history of requests from each client device 306, etc.).

Gateway device 304 may generate output streams of the content (e.g., each at a corresponding output bit rate) to provide to client devices 306 (e.g., output stream I to client device 306a, output stream II to client device 306b, and output stream III to client device 306c). Each output stream may comprise either a transcoded input stream or a non-transcoded input stream, as discussed above. Gateway device 304 may pass each non-transcoded input stream to a client device 306 without having to transcode it, thereby allowing gateway device 304 to avoid expending resources to perform the transcoding. Thus, in accordance with various aspects of the subject technology, gateway device 304 may generate output streams such that a number of output streams comprising non-transcoded input streams (as opposed to transcoded input streams) is maximized.

In order to maximize the number of output streams that comprise non-transcoded input streams, gateway device 304 may first identify the input streams that do not need to be transcoded. These streams, for example, may be associated with corresponding input bit rates that match the output bit rates. Thus, according to S406, gateway device 304 may compare the input bit rates to the output bit rates.

For those input bit rates that match the output bit rates, gateway device 304 may use the corresponding input streams to generate corresponding output streams (S408). For example, assume that the output bit rate associated with output stream I is 30 mbps, the output bit rate associated with output stream II is 13 mbps, and the output bit rate associated with output stream III is 5 mbps. In this example, the input bit rates of stream A and stream D match the output bit rates of stream I and stream III, respectively. Thus, gateway device 304 may generate output stream I as comprising non-transcoded stream A, as well as generate output stream III as comprising non-transcoded stream D. In other words, gateway device 304 may pass stream A to client device 306a without having to transcode it. Similarly, gateway device 304 may pass stream D to client device 306c without having to transcode it.

On the other hand, for those input bit rates that do not match the output bit rates, gateway device 304 may need to transcode the corresponding input streams to the output bit rates. For example, since none of stream A, stream B, stream C, and stream D is associated with a bit rate that matches the output bit rate of 13 mbps (for stream II), at least one of stream A, stream B, stream C, or stream D may need to be transcoded to 13 mbps. As discussed above, for input streams that need to be transcoded, gateway device 304 does not necessarily select the input stream that is encoded at the highest bit rate (e.g., stream A). Rather, gateway device 304 may select an input stream that is encoded at a bit rate closest to the output bit rate, thereby allowing this input stream to be transcoded quickly.

Thus, in accordance with various aspects of the subject technology, gateway device 304 may generate output streams such that for each output stream comprising a transcoded input stream, a difference between a corresponding input bit rate and a corresponding output bit rate is minimized. In this regard, according to S410, gateway device 304 selects one or more input streams associated with corresponding input bit rates that differ from corresponding output bit rates the least compared to non-selected input streams. For example, since the input bit rate for stream B is 15 mbps and is closest to the output bit rate of 13 mbps for stream II, gateway device 304 may select stream B (as opposed to stream A, stream C, and stream D).

According to S412 and S414, gateway device 304 transcodes the selected one or more input streams (e.g., from S410) to the corresponding output bit rates, and generates corresponding output streams that comprise the transcoded input streams. For example, gateway device 304 may transcode stream B to 13 mbps. Thus, gateway device 304 may generate output stream II as comprising transcoded stream B.

According to S416, gateway device 304 transmits the generated output streams (e.g., from S408 or S414) to client devices 306. For example, gateway device 304 may transmit output stream I (e.g., comprising non-transcoded stream A) to client device 306a, output stream II (e.g., comprising transcoded stream B) to client device 306b, and output stream III (e.g., comprising non-transcoded stream D) to client device 306c.

Although gateway device 304 is described as implementing method 400 for facilitating the transmission of content from CDN 302 to client devices 306, it is understood that a device between any two communicating entities may implement method 400. For example, client device 306c may be connected to additional downstream communication devices. Thus, client device 306c may implement method 400 to facilitate the transmission of content from gateway device 304 to the additional downstream communication devices.

Furthermore, although method 400 describes that the plurality of input streams is received in S402, it is understood that the input streams may be received after gateway device 304 has determined which are the appropriate input streams to use to generate the output streams. For example, in one or more implementations, gateway device 304 may receive manifest file 310 in S402, which provides an indication of the plurality of input streams that are available to gateway device 304. After gateway device 304 has determined the output bit rates at which to transmit the content to client devices 306 in S404 (e.g., the output bit rates being requested by client devices 306), gateway device 304 may request and receive the appropriate input streams from CDN 302 that may be used to generate the output streams at the determined output bit rates. Thus, in accordance with various aspects of the subject technology, gateway device 304 may request and receive input streams from CDN 302 based not only on its own current network conditions, but also (or in the alternative) on the requests it received from client devices 306.

According to various aspects of the subject technology, a plurality of channels may be used to transmit any one or more streams of content described herein (e.g., from CDN 302 to gateway device 304 and/or from gateway device 304 to client devices 306). Using a plurality of channels may allow redundant streams to be transmitted, thereby allowing transmission reliability to be improved.

For example, assume that three channels, channel 1, channel 2, and channel 3, are used to transmit stream A, stream B, stream C, and stream D from CDN 302 to gateway device 304. Furthermore, assume that channel 1 has a capacity of 53 mbps, channel 2 has a capacity of 40 mbps, and channel 3 has a capacity of 32 mbps. In one or more implementations, each of stream A, stream B, stream C, and stream D may be simultaneously distributed over at least two of the channels. Thus, if an error occurs in the transmission of one stream in one channel, the same stream in a different channel may be used instead. Furthermore, the streams may be distributed in such a way that the capacity of each channel is maximized. An example of how stream A, stream B, stream C, and stream D may be distributed over channel 1, channel 2, and channel 3 is as follows: stream A (30 mbps), stream B (15 mbps), and stream D (5 mbps) may be transmitted in channel 1 (53 mbps); stream A (30 mbps) and stream C (10 mbps) may be transmitted in channel 2 (40 mbps); and stream B (15 mbps), stream C (10 mbps), and stream D (5 mbps) may be transmitted in channel 3 (32 mbps).

As shown in the foregoing example, each stream is distributed over two channels. Furthermore, the streams are distributed in such a way that the capacity of each channel is maximized. For channel 1, which has a capacity of 53 mbps, a total of 50 mbps is used from stream A, stream B, and stream D. For channel 2, which has a capacity of 40 mbps, a total of 40 mbps is used from stream A and stream C. For channel 3, which has a capacity of 32 mbps, a total of 30 mbps is used from stream B, stream C, and stream D. Note that if the streams are distributed in such a way so as to only maximize the capacity of each channel, stream A (30 mbps) may also be transmitted in channel 3 (32 mbps) instead of stream B (15 mbps), stream C (10 mbps), and stream D (5 mbps). Although the foregoing example is described, it is understood that streams may be distributed over a plurality of channels in any manner as long as one or more of the streams is simultaneously distributed over at least two of the channels and/or the streams are distributed in such a way that the capacity of each channel is maximized. Furthermore, if one or more of the streams is simultaneously distributed over at least two of the channels, the one or more streams may be distributed in such a way so as to maximize transmission redundancy (e.g., simultaneously distribute a stream in as many channels as is practicable and/or possible).

Although the one or more streams are described as being simultaneously distributed over at least two channels to achieve transmission redundancy/reliability, transmission redundancy/reliability can still be achieved even if none of the streams is simultaneously distributed over at least two channels. In such a case, transmission redundancy/reliability can be achieved as long as the streams being delivered over the channels are different versions of the same content. For example, assume that gateway device 304 requests stream A (30 mbps) from CDN 302 over channel 1 and stream B (15 mbps) from CDN 302 over channel 2. If stream A is lost temporarily, gateway device 304 can continue to provide the content to downstream client devices 306 by using stream B instead (albeit at a different bit rate).

Figure 5:
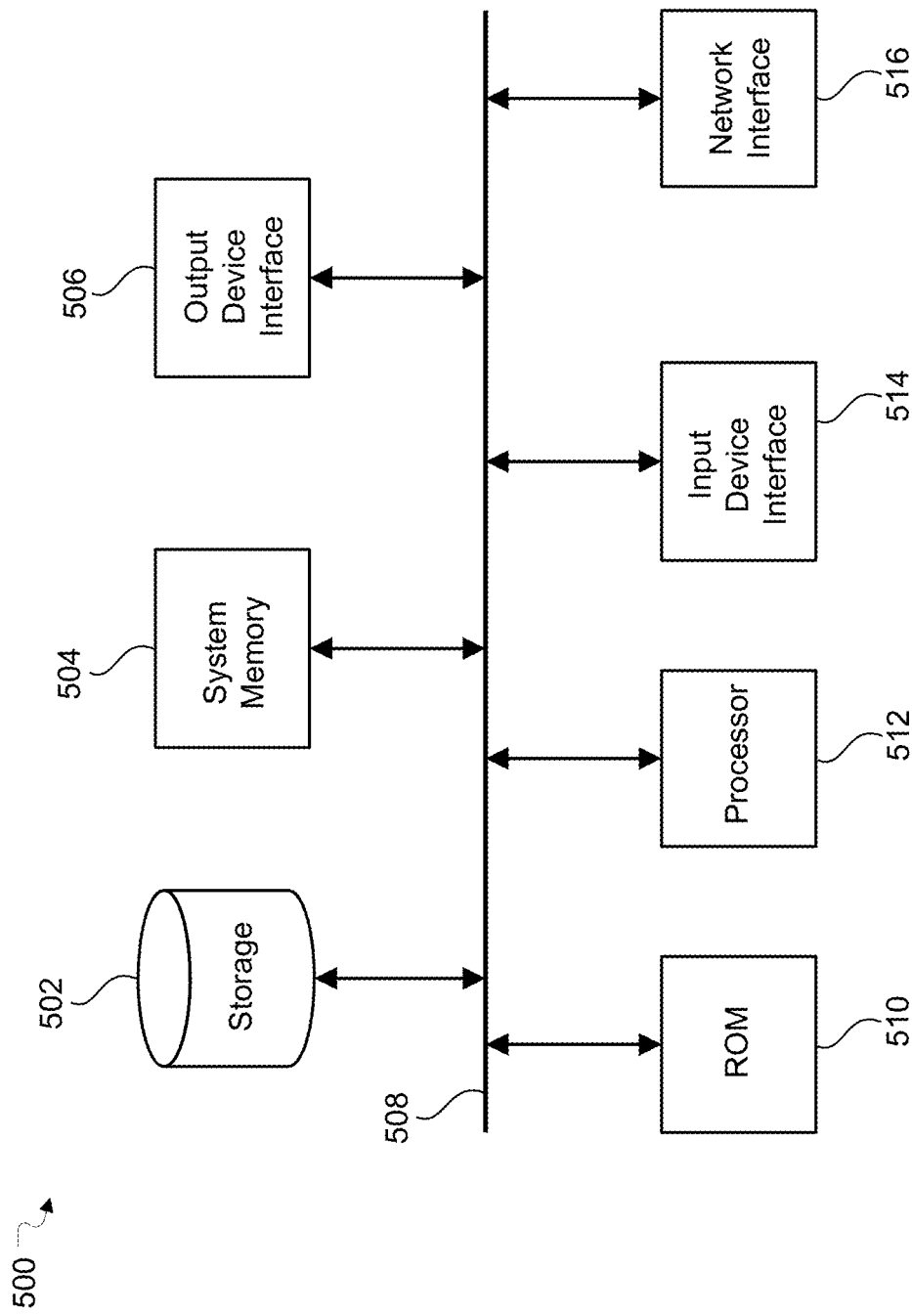
FIG. 5 conceptually illustrates an electronic system with which aspects of the subject technology may be implemented.

FIG. 5 conceptually illustrates electronic system 500 with which aspects of the subject technology may be implemented. Electronic system 500, for example, can be a desktop computer, a laptop computer, a tablet computer, a server, a switch, a router, a base station, a receiver, a phone, a personal digital assistant (PDA), a gateway device, or generally any electronic device that transmits signals/content over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While one or more implementations described herein may be software processes executed by microprocessors or multi-core processors, the one or more implementations may also be performed by one or more integrated circuits, such as application specific integrated circuits (ASICs) or field programmable gate arrays (FPGAs). Such integrated circuits, for example, may execute instructions that are stored on the circuit itself.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for transmitting content, the method comprising:
   receiving an indication of a plurality of input streams that each comprises a same content, wherein each of the plurality of input streams is associated with a different input bit rate of a plurality of input bit rates;
   determining a plurality of expected output bit rates at which to transmit the content to one or more client devices;
   comparing the plurality of input bit rates to the plurality of expected output bit rates;
   identifying, based at least in part on the comparing, at least two of the plurality of input streams to receive to minimize transcoding used to provide the plurality of expected output bit rates;
   simultaneously receiving the identified at least two of the plurality of input streams;
   generating, by a server, a plurality of output streams that each comprise the same content, wherein each generated output stream of the plurality of output streams is associated with a corresponding expected output bit rate of the plurality of expected output bit rates and comprises a transcoded input stream or a non-transcoded input stream,
   wherein the plurality of output streams is generated such that a number of the plurality of output streams comprising the non-transcoded input stream is maximized and the plurality of output streams are generated before requests for the plurality of output streams are received; and
   transmitting the generated plurality of output streams to the one or more client devices.

2. The method of claim 1, wherein transmitting the generated plurality of output streams comprises distributing the generated plurality of output streams over a plurality of channels.

3. The method of claim 2, wherein each of the plurality of channels is associated with a capacity, and wherein the generated plurality of output streams are distributed such that the capacity for each of the plurality of channels is maximized.

4. The method of claim 2, wherein each generated output stream of the generated plurality of output streams is simultaneously distributed over at least two of the plurality of channels.

5. The method of claim 2, wherein each generated output stream of the generated plurality of output streams is distributed to a corresponding one of the plurality of channels.

6. The method of claim 1, wherein each of the plurality of input streams comprises a same segment of the content encoded at a corresponding input bit rate of the plurality of input bit rates.

7. The method of claim 1, wherein determining the plurality of expected output bit rates comprises receiving, from the one or more client devices, requests for the content at the plurality of expected output bit rates.

8. The method of claim 1, wherein the plurality of output streams is generated such that for each output stream of the plurality of output streams that comprises the transcoded input stream, a difference between a corresponding input bit rate of the plurality of input bit rates and a corresponding expected output bit rate of the plurality of expected output bit rates is minimized.

9. The method of claim 1, wherein receiving the indication of the plurality of input streams comprises receiving a manifest file that indicates the plurality of input streams.

10. The method of claim 1, wherein the non-transcoded input stream bypasses the server without being transcoded.

11. The method of claim 1, wherein generating the plurality of output streams comprises:
   selecting one or more of the plurality of input streams that are associated with corresponding input bit rates of the plurality of input bit rates that differ from corresponding expected output bit rates of the plurality of expected output bit rates the least compared to non-selected input streams of the plurality of input streams; and
   transcoding the selected one or more of the plurality of input streams to generate corresponding one or more of the plurality of output streams that each comprises a corresponding transcoded input stream of the plurality of input streams.

12. The method of claim 1, wherein generating the plurality of output streams comprises:
   bypassing the server for one or more of the plurality of input streams to generate corresponding one or more of the plurality of output streams that each comprises a corresponding non-transcoded input stream of the plurality of input streams.

13. A system comprising:
   at least one processor circuit configured to:
      receive an indication of a plurality of input streams that each comprises a content item, wherein each input stream is associated with one of a plurality of input bit rates;
      determine a plurality of output bit rates at which to transmit the content item to one or more client devices;
      identify at least two of the plurality of input streams to receive to minimize transcoding used to provide the plurality of output bit rates;
      receive the identified at least two of the plurality of input streams;
      responsive to receiving the identified at least two of the plurality of input streams, generate, by a server, a plurality of output streams that each comprise the content item, wherein each generated output stream of the generated plurality of output streams is associated with a corresponding output bit rate of the plurality of output bit rates and comprises a transcoded input stream or a non-transcoded input stream,
      wherein the plurality of output streams is generated such that a number of the plurality of output streams that comprises the non-transcoded input stream is maximized; and transmit the generated plurality of output streams to the one or more client devices.

14. The system of claim 13, wherein receiving the indication of the plurality of input streams comprises receiving the plurality of input streams distributed over a plurality of channels.

15. The system of claim 14, wherein each of the plurality of channels is associated with a capacity, and wherein the received plurality of input streams are distributed such that the capacity for each of the plurality of channels is maximized.

16. The system of claim 14, wherein each received input stream of the plurality of input streams is simultaneously distributed over at least two of the plurality of channels.

17. The system of claim 14, wherein each received input stream of the plurality of input streams is distributed to a corresponding one of the plurality of channels.

18. A computer program product comprising instructions stored in a non-transitory computer-readable storage medium, the instructions comprising:
   instructions to receive a plurality of input streams that each comprises a same content, wherein each of the plurality of input streams is associated with one of a plurality of input bit rates;
   instructions to determine a plurality of output bit rates at which to transmit the content to one or more client devices;
   instructions to compare the plurality of input bit rates to the plurality of output bit rates;
   instructions to generate, a plurality of output streams that each comprises the content based at least in part on the compare, wherein each of the plurality of generated output streams is associated with a corresponding output bit rate of the plurality of output bit rates and comprises a transcoded input stream or a non-transcoded input stream,
   wherein the plurality of output streams is generated such that a number of the plurality of output streams comprising the non-transcoded input stream is maximized, and
   wherein the plurality of output streams is generated such that for each of the plurality of output streams that comprises the transcoded input stream, a difference between a corresponding input bit rate of the plurality of input bit rates and a corresponding output bit rate of the plurality of output bit rates is minimized; and
   instructions to distribute the generated plurality of output streams to the one or more client devices over a plurality of channels.

19. The computer program product of claim 18, wherein the non-transcoded input stream passes the generating without being transcoded.

20. The computer program product of claim 18, wherein the instructions to generate the plurality of output streams further comprises:
   instructions to identify one or more of the plurality of input streams associated with corresponding one or more of the plurality of input bit rates that match one or more of the plurality of output bit rates,
   wherein the identified one or more of the plurality of input streams are used to generate corresponding one or more of the plurality of output streams that each comprises a corresponding non-transcoded input stream of the plurality of input streams;
   instructions to select one or more of the plurality of input streams associated with corresponding one or more of the plurality of input bit rates that differ from corresponding one or more of the plurality of output bit rates the least compared to non-selected input streams of the plurality of input streams; and
   instructions to transcode the selected one or more input streams of the plurality of input streams to generate corresponding one or more output streams of the plurality of output streams that each comprises a corresponding transcoded input stream of the plurality of input streams.

* * * * *